UNITED STATES PATENT OFFICE.

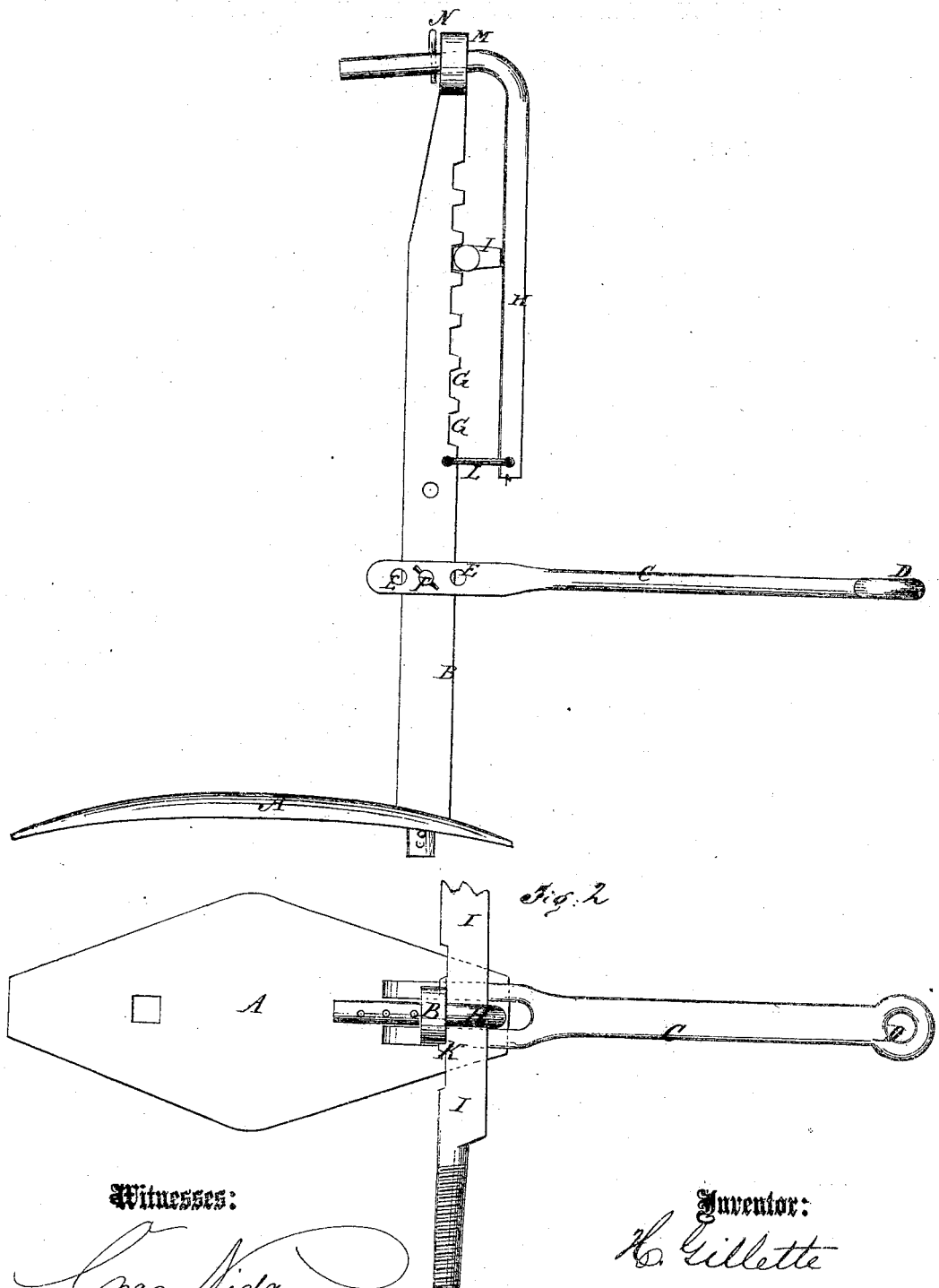

HENRY GILLETTE, OF MILLVILLE, NEW YORK.

IMPROVEMENT IN PLOWS.

Specification forming part of Letters Patent No. 127,475, dated June 4, 1872.

Specification describing a new and Improved Subsoil-Plow, invented by HENRY GILLETTE, of Millville, in the county of Orleans and State of New York.

My improvement pertains to a simple and novel arrangement of the adjusting and attaching apparatus of a subsoil attachment for plows, as hereinafter described.

Figure 1 is a side elevation of my improved subsoil-plow, and Fig. 2 is a plan view.

Similar letters of reference indicate corresponding parts.

A is the plow-blade or share, which is of a kind of elongated diamond-shape, and pointed at each end, and made convex on its upper side, and concave on its lower side, arranged so that it can be shifted, when one end is worn out, to wear the other. The front side of the bar B has numerous notches G in it, and is connected thereby and by the bar H to a cross-bar, I, which is made fast to the handles of the surface-plow a short distance above the ground. This bar I controls the depth of the cut of the share A, and will vary it by being shifted from one notch G to another. This bar I has also a notch, K, by which the bar B is prevented from shifting laterally. The bar H, which confines bars I and B together, is connected to B below the notches by a link, L, and the upper part, which is at right angles to the vertical part, passes through an eye, M, in the top of B, and is confined by a pin, N, which being taken out, the said bar H may be readily shifted forward to release the bar I to allow it to be shifted, and can be as readily shifted back again to confine the said bar I.

Having thus described my invention, I claim as new, and desire to secure by Letters Patent—

In combination with the cross-bar I and the notched bar B, provided with the eye M, the confining bar H, and link L, substantially as shown and described.

HENRY GILLETTE.

Witnesses:
HOMER SHERWOOD,
J. S. GILLETTE.